United States Patent [19]

Softly et al.

[11] Patent Number: 4,701,336

[45] Date of Patent: Oct. 20, 1987

[54] CIDER VINEGAR FLAVOR

[75] Inventors: Billy J. Softly; An S. Huang, both of Danbury, Conn.

[73] Assignee: Nabisco Brands, Inc., Parsippany, N.J.

[21] Appl. No.: 513,265

[22] Filed: Jul. 13, 1983

Related U.S. Application Data

[63] Continuation of Ser. No. 327,845, Dec. 7, 1981, abandoned.

[51] Int. Cl.$^4$ .................. A23L 1/221; A23L 1/226
[52] U.S. Cl. .................... 426/538; 426/534; 426/650; 426/17
[58] Field of Search .............. 426/650, 534, 538, 17

[56] References Cited

U.S. PATENT DOCUMENTS 2,696,441  12/1954  Kmieciak et al ............... 426/650
3,898,344  8/1975  Masuoka et al. ............. 426/650 X

FOREIGN PATENT DOCUMENTS 45-01238  1/1970  Japan ............................ 426/17
50-5025039  8/1975  Japan ........................... 426/650

OTHER PUBLICATIONS

Jacobs, The Chemistry & Technology of Food and Food Products, 1951, vol. III, Interscience Publishers; New York, pp. 1728–1730.

Blumenthal, Food Products, 1947, Chemical Publishing, Brooklyn, N.Y. pp. 106–107.

Aretander, Perfume and Flavor Chemicals, vol. I, 1969, publ. by the author; Montclair, N.J., Items No. 915; vol. II; Items No. 2513, 2529.

Furia et al., Fenaroli's Handbook of Flavor Ingredients, vol. 2, CRC Press; Cleveland, pp. 128, 461, 464.

Cruess, Commercial Fruit and Vegetable Products, 2nd Ed., 1938, McGraw Hill; New York, pp. 538–539, 555–557.

Van Straten et al., Volatile Compounds in Foods, 4th Ed., 1977, Central Inst. for Nutrition and Food Research; Netherlands, pp. 40.1–40.2.

Kahn et al., Identification of Volatile Components in Vinegars by Gas Chromatography, Mass Spectrometry, J. Agr. Food Chem., vol. 20, No. 2 (1972), pp. 214–218.

*Primary Examiner*—Joseph Golian
*Attorney, Agent, or Firm*—Richard Kornutik

[57] ABSTRACT

Disclosed are a composition simulating the flavor and aroma of cider vinegar, a vinegar product having a simulated cider vinegar flavor, and a method for imparting the flavor and aroma of cider vinegar to food products. A flavoring composition comprising diethyl succinate, beta-phenethyl formate and beta-phenethyl alcohol has been found to be essential to achieving a cider vinegar flavor and aroma. A preferred vinegar composition will comprise sugar, distilled vinegar, about 35 ppm diethyl succinate, about 2 ppm beta-phenethyl formate and about 1 ppm beta-phenethyl alcohol.

4 Claims, No Drawings

CIDER VINEGAR FLAVOR

This is a continuation, of application Ser. No. 327,845, filed Dec. 7, 1981 and now abandoned.

BACKGROUND OF THE INVENTION

The present invention relates to vinegar; and, more particularly, to improvements in the simulation of the flavor and aroma of cider vinegar.

Vinegar is a widely used product which is produced by a two-stage fermentation process. In the first fermentation stage, a suitable carbohydrate is biochemically converted to alcohol. In the second fermentation stage, the alcohol is biochemically oxidized to acetic acid, such as by the action of acetobacter. Vinegar, from whatever source, has certain characteristic flavors and aromas which are considered desirable to a wide variety of food products, among which are mayonnaise, catchup, and salad dressings.

The principal flavor component of vinegar is the acetic acid content, which is the principal constituent of vinegar, other than water. There are, however, a wide variety of other flavor and aroma producing components within vinegar; and, these depend, to some extent, upon the source of fermentable carbohydrate employed in the first fermentation stage, as well as final processing. For example, Kahn et al in *J. Agr. Food Chem.*, Vol. 20, No. 2, pages 214–218, 1972, identified a total of 61 compounds present in one or more types of vinegar. They noted that few differences in volatile compounds were found between vinegar products based simply upon whether a trickling or a submerged fermentation was employed, but that large differences were noted between vinegar products classified as cider, distilled, malt, and wine vinegars. Unlike the types of vinegar referred to as cider, wine, or malt, the term "distilled" vinegar does not denote the source of fermentable material, but indicates that the fermentation product has been distilled after either the first or second fermentation.

Distilled vinegar can be produced more economically than the other types of vinegar; however, because it is distilled, some of the characteristic volatile and non-volatile flavors are absent. While most consumers would not be able to characterize the difference in flavor between cider vinegar and distilled vinegar, they can perceive the difference between the two and recognize the absence of the characteristic distinguishing flavors and aromas of cider vinegar when presented distilled vinegar. In view of the relative economy of distilled vinegar, and its insulation from the fluctuations in price of apples, it would be desirable to provide a composition which simulates the flavor and aroma of cider vinegar and which could be added to food products alone or as a component of a vinegar product containing distilled vinegar.

BRIEF DESCRIPTION OF THE INVENTION

Accordingly, it is an object of the present invention to provide a composition which simulates the flavor and aroma of cider vinegar.

It is another object of the present invention to provide a vinegar product containing distilled vinegar which simulates the flavor and aroma of cider vinegar.

It is yet another object of the present invention to provide a method for imparting the flavor and aroma of cider vinegar to food products.

These and other objects are achieved according to the present invention. In its broad aspects, the invention provides a composition simulating the flavor and aroma of cider vinegar, which comprises diethyl succinate, beta-phenethyl formate and beta-phenethyl alcohol. Also provided is a vinegar product having a simulated cider vinegar flavor which comprises distilled vinegar and a flavoring composition as defined broadly above. The invention also provides a method for imparting the flavor and aroma of cider vinegar to a food product, which comprises adding to the food product a flavoring composition as defined above.

DETAILED DESCRIPTION

Cider vinegar is a complex composition which contains many flavor producing volatile and non-volatile compounds. Many of these have been characterized in the published literature, and many have not. For example, the above-noted reference to Kahn et al indicates that although their particular study identifies 61 volatile compounds present in various concentrates from vinegar, at least 20 more are shown to be present but are unidentified. Moreover, Kahn et al stress that there may be no direct correlation between the size of a peak on their chromatograms and the actual concentration of the component, represented by the peak, in untreated vinegars. They note that the peak size is affected not only by extractability or preferential solubility of each compound in the extracting solvents, but also by the compounds gas-liquid chromatographic responses. Moreover, there can be no assurance that the compounds present in the concentrates are those naturally present in the untreated vinegar starting materials. Similarly, the characterization of the compositions of the non-volatile components is fraught with difficulty because the procedures for separating and identifying all of the components could alter the structural chemistry or relative proportions of the components. The present invention is based upon the discovery that a very limited class of volatile compounds, preferably in combination with other characterizing compounds such as acids and sugars, are highly reminiscent of the characteristic flavor and aroma of natural cider vinegar.

The flavoring composition according to the present invention can be employed as a component of a food product not containing vinegar in any form or it can be employed along with vinegar to provide a vinegar product. In either case, the resulting product will simulate the flavor and aroma of cider vinegar even though no natural cider vinegar need be present. It is of course possible, to provide a blended vinegar product which contains a portion of cider vinegar and a portion of distilled vinegar containing the flavoring composition according to the present invention.

In addition to the diethyl succinate, the beta-phenethyl formate, and the beta-phenethyl alcohol, the composition according to the present invention preferably further comprises sugar and edible acid in amounts desired for more closely simulating the overall flavor and mouthfeel of natural cider vinegar. The sugar and acid components can be chosen to simulate the natural composition of cider vinegar, or simply to simulate the net flavor effect of the naturally-occurring sugar and acid components.

The sugar can be any of those sweet carbohydrates normally employed for providing a sweetened taste to food products. Suitable as the sugar would be at least one member selected from the group consisting of sucrose, glucose, maltose, mannose, galactose, xylose, arabinose, ribose, fructose, rhamnose, corn syrup solids, and high fructose corn syrup solids. Preferred among the sugars are fructose and glucose. Preferably, the sugar will be employed in an amount of from about 2 to about 5% based upon the weight of an aqueous solution containing about 6% acid, calculated as acetic acid.

The acid component of the preferred composition, like the sugar component, can be selected to either approximate or simply simulate the acid composition of natural cider vinegar. The preferred compositions will contain at least one food acid which is a member selected from the group consisting of acetic, malic, adipic, citric, glutamic, lactic, succinic, tartartic, propionic, butyric, iso-butyric, valeric, iso-valeric and caproic. Of these acids, the acetic acid is the most preferred additive, simply because it is the principal constituent of natural cider vinegar other than water. The acetic acid can be added as glacial acetic acid, distilled vinegar, or any other type of vinegar. Other acids preferred on the basis of their flavor effect are those selected from the group consisting of propionic acid, butyric acid, iso-butyric acid, iso-valeric acid, and combinations of at least two of these. Most preferably, the acetic acid will be employed as part of the final composition at a concentration of from about 4 to about 20%, and will comprise greater than about 90% of the total weight of acid in the composition.

Because natural cider vinegar is such a complex composition, containing such a wide variety of compounds as noted in the above-mentioned reference to Kahn et al wherein 62 volatile compounds are identified, and at least 20 more are shown to be present but not identified, the composition of the invention will also preferably include other volatile flavor-producing compounds. Among these are ethyl acetate, which is believed to have a wine-like essence; 2-pentanol, which is believed to have a fresh apple, green note; 2-methyl-3-heptanol and 3-methyl-1-butanol, which together are believed to have a slight-sour, apple-like, green note; cis-2-butene-1,4-diol and 2,4-dimethyl-3-hexanol, which together are believed to have a weak fermented apple note; 2-propanol and 1,3-dimethoxy-2-propanol, which together are believed to have a sweet, green note; 3-pentanol, 4-methyl-2-oxapenta-3-ene, and tridecane, which together are believed to have a metallic, fruity, flower-like note; 2-phenyl ethanol, glutaric acid, methylmethoxy acetate, 3-hydroxy iso-valeric acid-methyl ester, propionic acid, 2,4-dimethyl-3-pentanol, and pivalolactone, which together are believed to have a honey sweet, sour, salty-fish like note; methyl iso-butyrate and with diethyl succinate, carbamic acid-methyl ester, which together are believed to have a sour apple note; carbamic acid-methyl ester, which is believed to have a sour apple note in combination with an as yet unidentified compound; phenethyl alcohol which has a good fermented apple note; phenethyl alcohol, 2,3-dihydrobenzaldehyde, and beta-phenethyl formate which together are believed to have a typical cider vinegar, good fermented apple, flower-like note. Preferably, the composition according to the present invention will contain at least one member selected from the group consisting of 2,3-dihydrobenzaldehyde, 3-pentanol, 4-methyl-2-oxapenta-3-ene, 2,4-dimethyl-3-hexanol, and cis-2-butene-1,4-diol.

The principal essences of the flavoring composition according to the present invention, namely the combination of diethyl succinate, beta-phenethyl formate, and beta-phenethyl alcohol, will preferably be present at relative weight ratios of within the ranges of 15 to 50 parts of diethyl succinate: 1 to 4 parts of beta-phenethyl formate: 0.5 to 2 parts of beta-phenethyl alcohol (i.e., 15-50:1-4:0.5-2). In the preferred vinegar products according to the invention, which have an acetic acid content of from about 4 to about 20%, it is preferred that the concentration of the diethyl succinate be from about 15 to 150 ppm, the concentration of the beta-phenethyl alcohol be from about 0.5 to about 10 ppm, and the concentration of the beta-phenethyl formate be from about 0.25 to about 4 ppm. The relative percentages of the sugar and acid components will be within the ranges previously set forth, while the levels of the volatile additives can be selected to impart the desired degree of their respective flavor and aroma contributions. Typically, these materials will be employed at levels within the range of from about 1 ppm to about 50 ppm, based upon the weight of the preferred vinegar composition containing 4–20% acetic acid.

The following examples are presented for the purpose of further illustrating and explaining the present invention and are not to be taken as limiting in any regard. Unless otherwise indicated, all parts and percentages are by weight, based upon the weight of the product or intermediate at the indicated stage in processing.

EXAMPLE 1

According to this example, a vinegar product, based upon distilled vinegar, is prepared according to the following formulation and is judged by a panel of expert tasters to have a flavor and aroma similar in most principal aspects to natural cider vinegar. The formulation is as follows:

| Component | Amount |
|---|---|
| Distilled vinegar (6% acid, calculated as acetic acid) | 98.75 parts by weight |
| Diethyl succinate | 35 ppm |
| Beta-phenethyl alcohol | 2 ppm |
| Beta-phenethyl formate | 1 ppm |
| Sodium citrate | 0.25 parts by weight |
| Propionic acid | 108 ppm |
| Isobutyric acid | 126 ppm |
| Butyric acid | 18 ppm |
| Isovaleric acid | 228 ppm |
| Apple cider concentrate | 0.83 parts by weight |
| Containing at least: | |
| Glucose | 27 gm/100 cc |
| Frucrose | 15 gm/100 cc |
| Sucrose | 1.83 gm/100 cc |

EXAMPLE 2

This example demonstrates the contribution of the diethyl succinate, beta-phenethyl alcohol and beta-phenethyl formate to the achievement of a natural cider vinegar flavor and aroma.

A panel of expert tasters is given a solution comprising distilled water containing 35 parts of per million diethyl succinate, 2 parts per million of beta-phenethyl alcohol and 1 part per million of beta-phenethyl formate for the purpose of characterizing the flavor and aroma. All panelists indicate that the flavor and aroma is reminiscent of natural cider vinegar.

The above description has been presented for the purpose of teaching the person of ordinary skill in the art how to practice the present invention. It is not intended to detail each and every obvious modification and variation thereof which would be apparent to the person of ordinary skill in the art upon reading. It is intended, however, to include all such obvious modifications and variations within the scope of the invention which is defined by the following claims.

We claim:

1. A composition which simulates the flavor and aroma of cider vinegar consisting of diethyl succinate, beta-phenethyl formate and beta-phenethyl alcohol at relative weight ratios of within the ranges of 15-50-:1-4:0.5-2.0.

2. A composition which simulates the flavor and aroma of cider vinegar consisting of diethyl succinate, beta-phenethyl formate and beta-phenethyl alcohol at relative weight ratios of within the ranges of 15-50-:1-4:0.5-2.0, a sugar and an edible acid.

3. A composition which simulates the flavor and aroma of cider vinegar consisting of diethyl succinate, beta-phenethyl formate and beta-phenethyl alcohol at relative weight ratios of within the ranges of 15-50-:1-4:0.5-2.0 and at least one member selected from the group consisting of 2,3-dihydrobenzaldehyde, 3-pentanol, 4-methyl-2-oxapenta-3-ene, 2,4-dimethyl-3-hexanol, and cis-2-butene-1,4-diol.

4. A composition which simulates the flavor and aroma of cider vinegar consisting of diethyl succinate, beta-phenethyl formate and beta-phenethyl alcohol in relative weight ratios of within the ranges of 15-50-:1-4:05-2.0, an edible acid, a sugar and at least one member selected from the group consisting of 2,3-dihydrobenzaldehyde, 3-pentanol, 4-methyl-2-oxapenta-3-ene, 2,4-dimethyl-3-hexanol, and cis-2-butene-1,4-diol.

* * * * *